(No Model.)
C. A. SCHIEREN.
BELTING.
No. 455,852. Patented July 14, 1891.
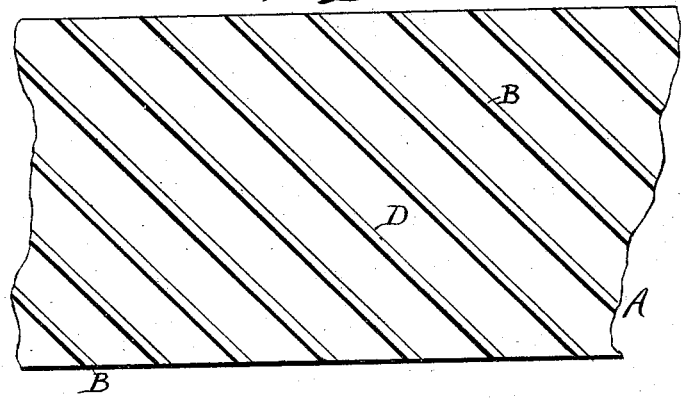
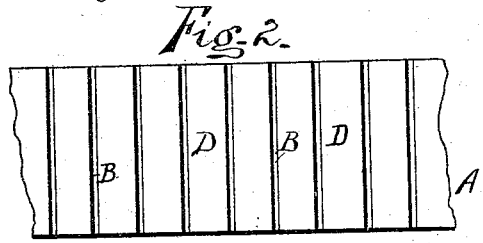
Witnesses
L. M. Bartlett.
Titian W. Johnson.
Inventor
Charles A. Schieren
by F. B. Brock
Atty

UNITED STATES PATENT OFFICE.

CHARLES A. SCHIEREN, OF BROOKLYN, NEW YORK.

BELTING.

SPECIFICATION forming part of Letters Patent No. 455,852, dated July 14, 1891.

Application filed June 7, 1889. Serial No. 313,491. (No model.)

*To all whom it may concern:*

Be it known that I, CHARLES A. SCHIEREN, a citizen of the United States, residing at Brooklyn, in the county of Kings and State of New York, have invented certain new and useful Improvements in Belting; and I do declare the following to be a full, clear, and exact description of the invention, such as will enable others skilled in the art to which it appertains to make and use the same, reference being had to the accompanying drawings, and to the letters of reference marked thereon, which form a part of this specification.

My improvements relate to machine-belting.

The object of my invention is to prevent the slip of a belt upon the pulley due to the presence of a confined layer of air between the pulley and belt-faces. To prevent such air-cushioning, my improvements provide for a series of transverse channels on the working face of the belt.

To enable others skilled in the art to make and use the same, I will now proceed to describe the same in detail, and then point out the patentable features in the claims.

Figure 1 is a plan of the working face of the belt, having oblique channels. Fig. 2 is a similar view showing the channels running at right angles to the length of the belt. Fig. 3 is a cross-section of a single-ply belt, and Fig. 4 is a similar view of a double-ply belt, both showing my improvements applied. Fig. 5 is a cross-section of a two-ply belt provided with channels.

In the drawings, A represents a belt having channels B formed on its side. These channels extend obliquely across the width of the belt. The channels may be compressed in the belt fabric by pressure. They may also be chamfered or gouged out by suitable machinery. I contemplate also employing strips laid upon the side of the belt, the edges of which, being separated slightly, form the channels in the side of the belt.

In Fig. 2 the channels B are at right angles to the length of the belt. The belts shown in Figs. 1 and 2 are both formed of strips D of belt fabric laid upon a one or more ply belt, with their edges separated, as shown. The strips C may first be cemented on the adjacent belt-layer and afterward stitched or otherwise secured thereto, or any other known means may be employed in the manufacture of the belt.

Fig. 5 may represent a cross-section of Fig. 1, or a longitudinal section of Fig. 2, and shows the arrangement of the strips D upon the backing or layer C.

In Fig. 3 a single-ply belt A is shown with the channels B compressed in the belt or chamfered out, while Fig. 4 shows a two-ply belt having the channels similarly formed.

Any number of layers or plies may be used in connection with my improvements. The belt may be of leather, cotton, wire, paper, canvas, rubber, or any other fabric or metal adapted for belting purposes. The channels B may lie in straight or curved lines.

In operation my improved belt, in running upon pulleys, forces the confined layer of air between it and the pulley-face into the channels or grooves of the belt, from whence it escapes to the outer edges of the belt. This action results in an increased efficiency of the belt due to the absence of any "slip" thereof upon the pulley.

What I claim is—

1. A belt of the character described, having a series of grooves upon its working face transversely disposed thereon.

2. A belt of the character described, having transverse strips laid thereon, with spaces left between the strips forming grooves in the working face.

In testimony whereof I affix my signature in presence of two witnesses.

CHAS. A. SCHIEREN.

Witnesses:
ALFRED J. MENGE,
CHAS. J. SCHLEGEL.